(12) United States Patent
Chang et al.

(10) Patent No.: US 8,668,860 B2
(45) Date of Patent: *Mar. 11, 2014

(54) PLASTIC ARTICLE AND METHOD OF MANUFACTURING THE SAME

(75) Inventors: Chun-Yuan Chang, Taipei Hsien (TW); Chung-Chi Tseng, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 714 days.

This patent is subject to a terminal disclaimer.

(21) Appl. No.: 12/732,141

(22) Filed: Mar. 25, 2010

(65) Prior Publication Data

US 2010/0255273 A1    Oct. 7, 2010

(30) Foreign Application Priority Data

Apr. 2, 2009  (CN) .......................... 2009 1 0301312
Apr. 9, 2009  (CN) .......................... 2009 1 0301455

(51) Int. Cl.
    *B29C 45/14*    (2006.01)
(52) U.S. Cl.
    USPC ........ 264/328.1; 264/132; 264/284; 264/316; 264/334; 264/400
(58) Field of Classification Search
    USPC ............... 264/132, 284, 316, 328.1, 334, 400
    See application file for complete search history.

(56) References Cited

U.S. PATENT DOCUMENTS

| | | | | |
|---|---|---|---|---|
| 4,482,515 A * | 11/1984 | Buhler et al. | ................ | 264/102 |
| 4,865,793 A * | 9/1989 | Suzuki et al. | ................ | 264/278 |
| 4,994,224 A * | 2/1991 | Itoh et al. | ................ | 264/247 |
| 5,096,652 A * | 3/1992 | Uchiyama et al. | ............ | 264/511 |
| 5,106,553 A * | 4/1992 | Onisawa et al. | ............ | 264/106 |
| 5,376,324 A * | 12/1994 | Kim | ................ | 264/241 |
| 5,676,896 A * | 10/1997 | Izumida et al. | ............ | 264/132 |
| 5,738,287 A * | 4/1998 | Vanderberg | ............ | 241/101.76 |
| 5,925,302 A * | 7/1999 | Oono et al. | ................ | 264/267 |
| 6,143,227 A * | 11/2000 | Heiden et al. | ................ | 264/267 |
| 6,193,916 B1 * | 2/2001 | Richters et al. | ............ | 264/46.6 |
| 6,217,813 B1 * | 4/2001 | Sorensen et al. | ............ | 264/328.1 |
| 6,752,946 B2 * | 6/2004 | Toyooka | ................ | 264/154 |
| 7,458,793 B2 * | 12/2008 | Toyooka et al. | ............ | 425/112 |
| 2001/0028129 A1 * | 10/2001 | Oono et al. | ................ | 264/219 |
| 2001/0038162 A1 * | 11/2001 | Oono et al. | ................ | 264/219 |
| 2005/0127565 A1 * | 6/2005 | Wilson et al. | ................ | 264/275 |
| 2007/0026197 A1 * | 2/2007 | Suga et al. | ................ | 428/172 |
| 2007/0184148 A1 * | 8/2007 | Toyooka et al. | ............ | 425/542 |
| 2009/0072442 A1 * | 3/2009 | Chang | ................ | 264/275 |
| 2009/0194908 A1 * | 8/2009 | Chen et al. | ................ | 264/328.1 |
| 2009/0230590 A1 * | 9/2009 | Wu et al. | ................ | 264/328.1 |
| 2010/0255246 A1 * | 10/2010 | Chang et al. | ................ | 428/68 |
| 2010/0255267 A1 * | 10/2010 | Chang | ................ | 428/187 |
| 2010/0255273 A1 * | 10/2010 | Chang et al. | ................ | 428/203 |
| 2010/0260971 A1 * | 10/2010 | Chang | ................ | 428/141 |

FOREIGN PATENT DOCUMENTS

JP     1991236920 A    10/1991
JP     2000355027 A    12/2000

* cited by examiner

*Primary Examiner* — Matthew Daniels
*Assistant Examiner* — Saeed Huda
(74) *Attorney, Agent, or Firm* — Altis Law Group, Inc.

(57) ABSTRACT

An in-mold-decoration method for plastic articles is provided. An uninterrupted film is provided and transported into a mold. A predetermined area of the film attaches to an inner surface of a cavity of a female mold of the mold. The predetermined area of the film is cut from the uninterrupted film during closing the mold.

9 Claims, 13 Drawing Sheets

PLASTIC ARTICLE AND METHOD OF MANUFACTURING THE SAME

CROSS-REFERENCE TO RELATED APPLICATION

Relevant subject matter is disclosed in a co-pending U.S. patent application Ser. No. 12/732,145 filed on the same date and entitled "PLASTIC ARTICLE", which is assigned to the same assignee with this patent application.

TECHNICAL FIELD

The disclosure relates to a plastic article, and an in-mold-decoration (IMD) method for manufacturing the plastic article.

DESCRIPTION OF RELATED ART

A common method for IMD includes the following steps: cutting an attached film according to a surface of the plastic article from a film roll, putting the attached film into a cavity of a mold, injecting, molding then opening the mold to retrieve the plastic article complete with the film attached thereto. However, the attached film shrinks very easily, while in the injection process, and thus, will not completely cover the surface of the plastic article.

DETAILED DESCRIPTION

Figure 1:
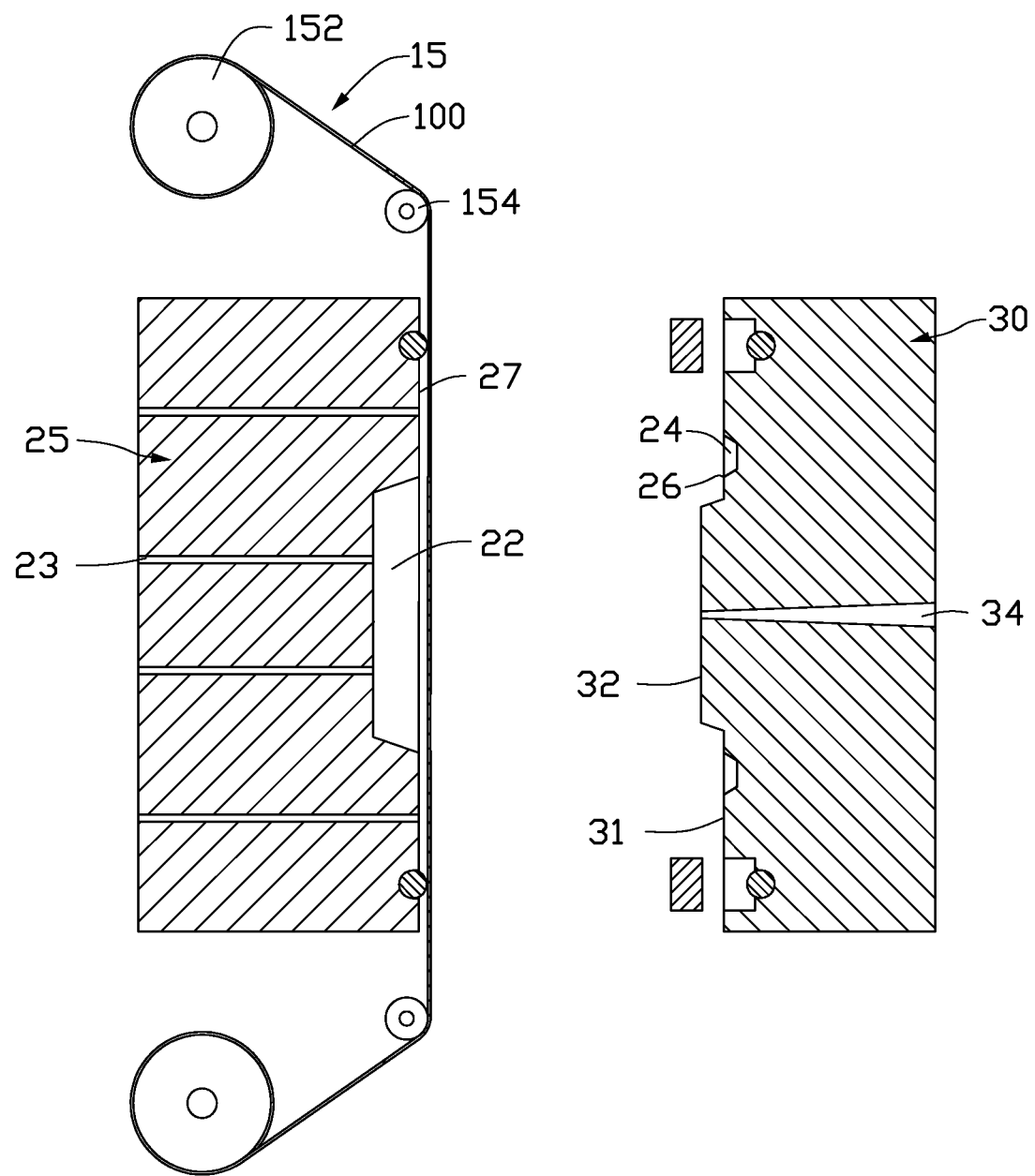
FIG. 1 is a cross-sectional view of an injection mold used in an embodiment of a method of manufacturing a plastic article.

Referring to FIG. 1, an embodiment of an injection mold for in-mold-decoration includes a transport 15, a female mold 25, and a male mold 30.

The transport 15 includes two transporting rollers 152 and two guiding rollers 154 positioned at opposite ends of the mold respectively, for transporting a film 100 into the female and male molds 25 and 30.

The female mold 25 defines a cavity 22 in a first side 27. A plurality of air venting holes 23 define in the female mold 25 and connect to the cavity 22. Each air venting hole connects to a vacuum pump (not shown) for adsorbing the film 100 that disposes into the female and male molds 25 and 30 into the cavity 22.

Figure 2:
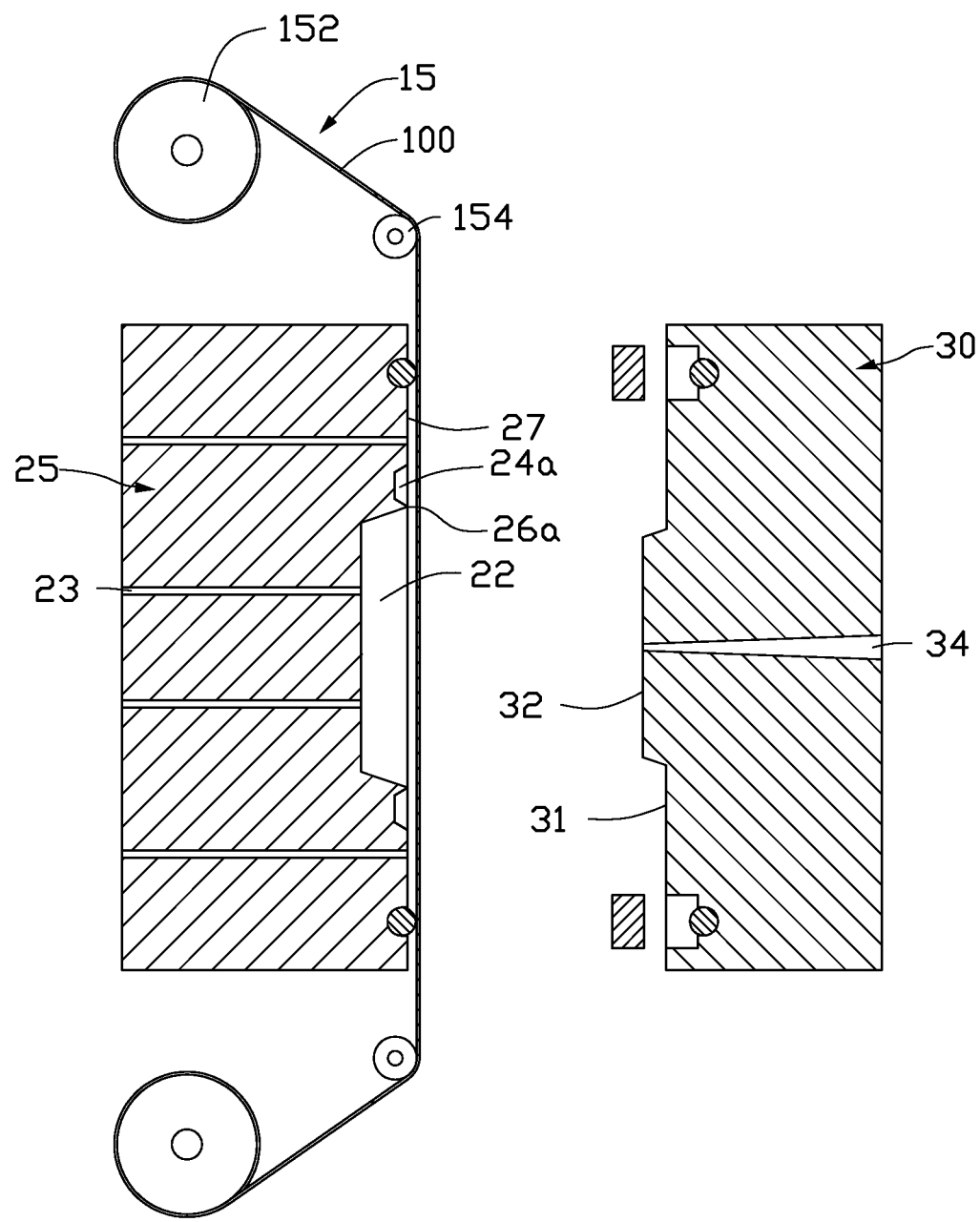
FIG. 2 is a cross-sectional view of a variational injection mold used in the method of manufacturing the plastic article.

The male mold 30 includes a second side 31 facing the first side 27 of the female mold 25, the second side 31 forms a protrusion 32 protruding towards the female mold 25 and mating with the cavity 22 of the female mold 25. An injection port 34 is defined in a center of the protrusion 32, for injecting molten resin into the cavity 22. A slot 24 defines in the second side 31 of the male mold 30 around the protrusion 32. A cutting portion 26 forms on a wall bounding the slot 24 between the protrusion 32 and the slot 24. Referring to FIG. 2, the female mold 25 defines a slot 24a around the cavity 22. A cutting portion 26a is formed on a wall bounding the slot 24a and the cavity 22.

Figure 3:
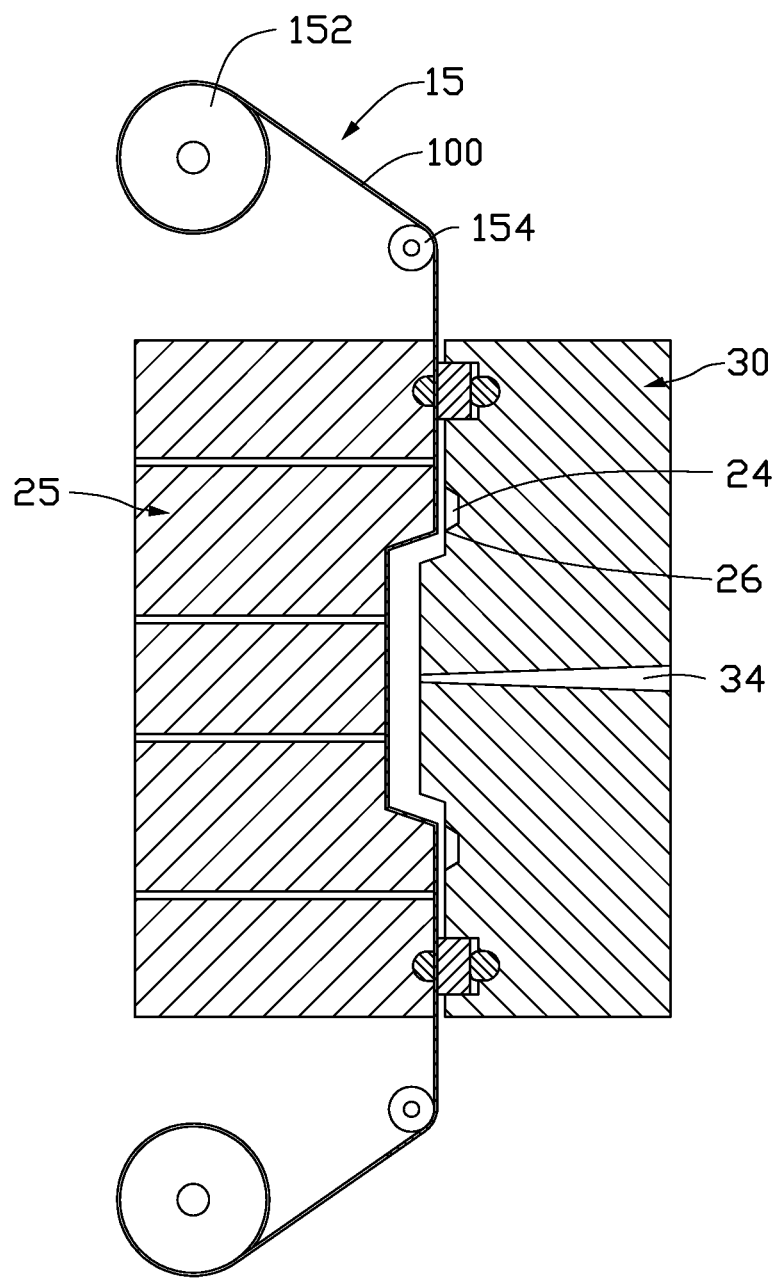
FIG. 3 is similar to FIG. 1, but showing the injection mold closed to a first position.
Figure 4:
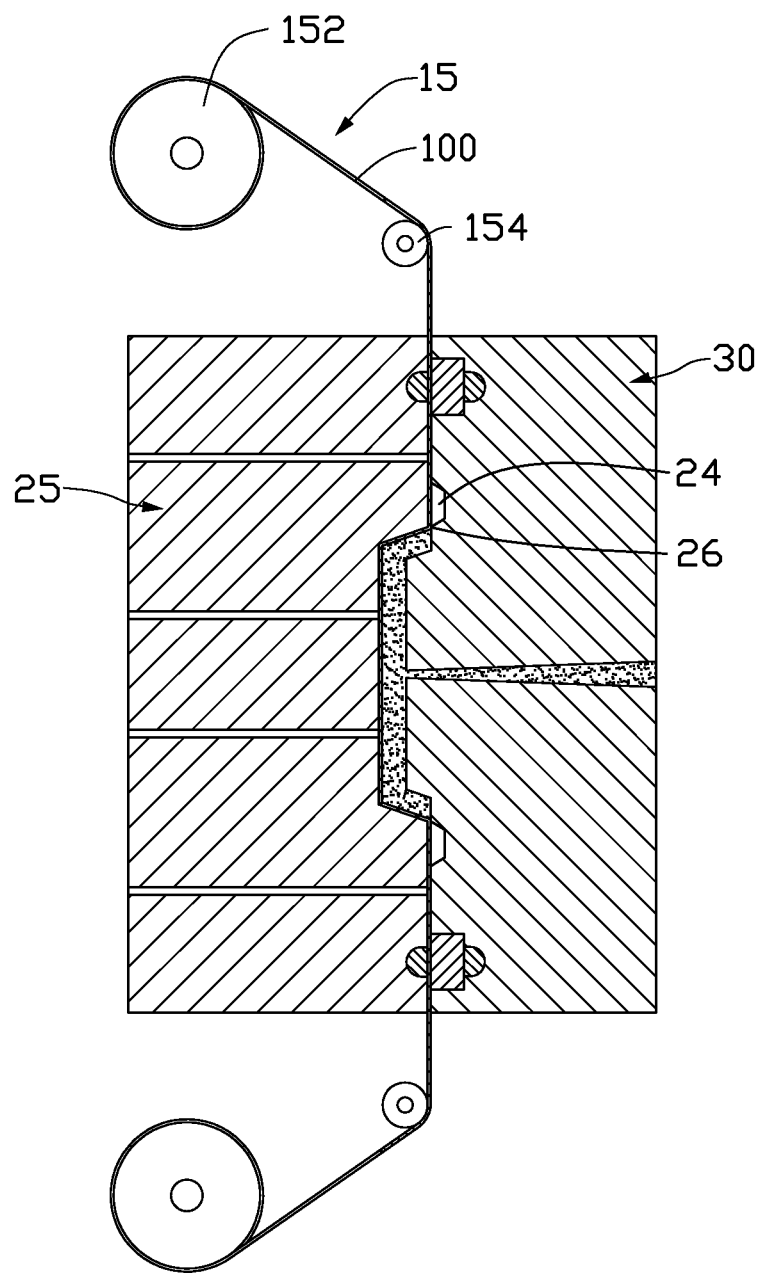
FIG. 4 is similar to FIG. 3, but showing the injection mold closed to a second position.
Figure 5:
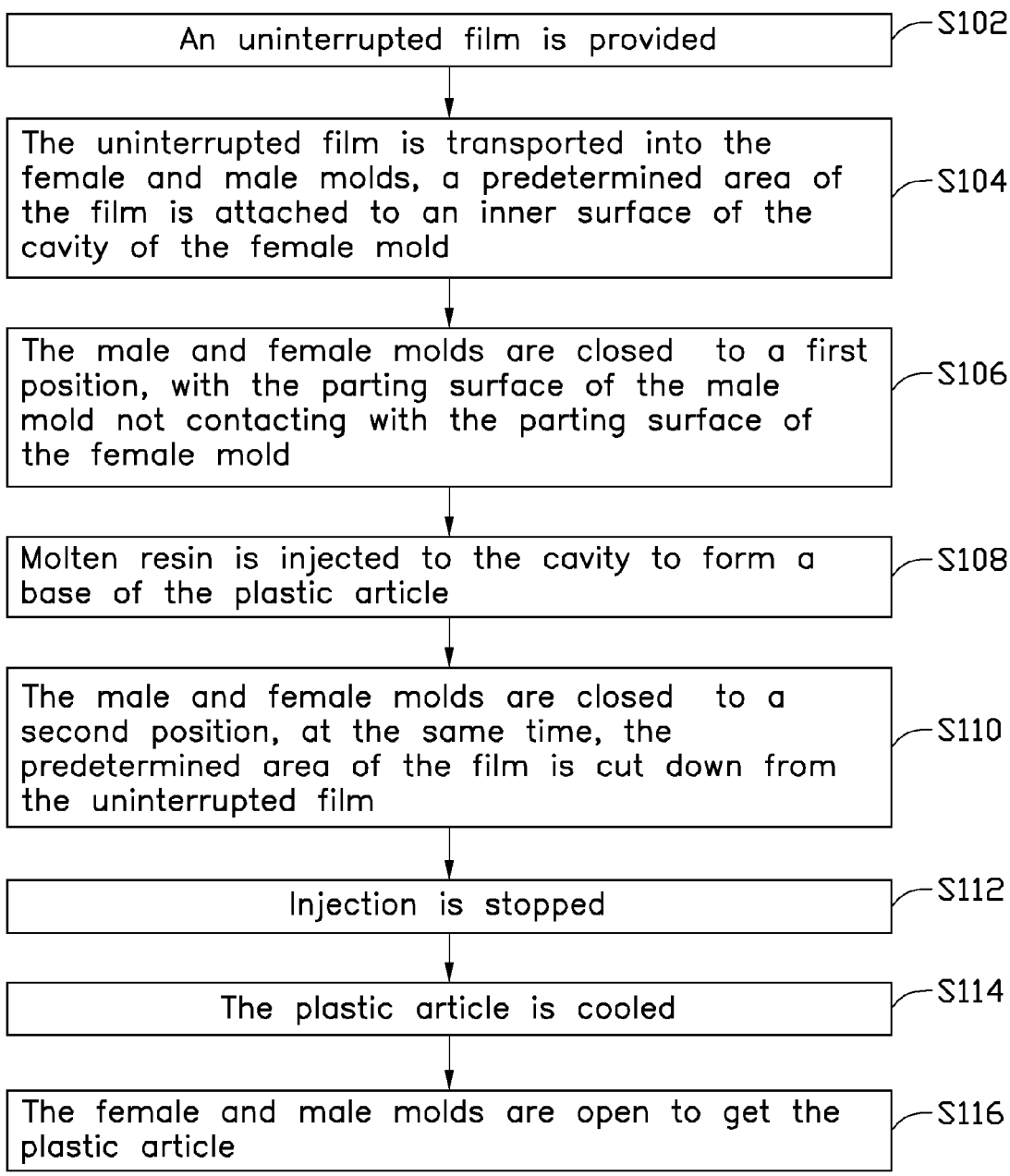
FIG. 5 is a flowchart of a first exemplary embodiment of a method for manufacturing the plastic article.

Referring to FIGS. 3-5, a first exemplary embodiment of a method using the above-mentioned injection mold to manufacture a plastic article, includes the following steps:

Step S102, the uninterrupted film 100 with patterns and characters printed thereon, is provided, and rolled around the transporting roller 152 of the transport 15.

Step S104, the uninterrupted film 100 is transported between the female and male molds 25 and 30 by the transport 15, a predetermined area of the film 100 attaches to an inner surface of the cavity 22 of the female mold 25. In one embodiment, the predetermined area of the film 100 attaches to the inner surface of the cavity 22 by vacuumizing the cavity 22 through the plurality of venting holes 23 of the female mold 25.

Step S106, the male and female molds 30 and 25 close to a first position, with the parting surface of the male mold 30, the second side 31, not contacting the parting surface of the female mold 25, the first side 27.

Step S108, molten resin is injected into the cavity 22 through the injection port 34 of the male mold 30 to form a base of the plastic article. At first about 90%-99.5% of the molten resin is injected into the cavity 22. In this process, the predetermined area of the film 100 attaches to the base of the plastic article.

Step S110, the male and female molds 30 and 25 further close to a second position, at this time, the remnant of molted resin is injected into the cavity 22. The parting surface of the male mold 30 presses the parting surface of the female mold 25, thus the cutting portion 26 of the male mold 30 cuts the predetermined size of the film 100 attached to the base of the plastic article.

Step S112, injection stops.

Step S114, the plastic article cools.

Step S116, the female and male molds 25 and 30 open to retrieve the plastic article whose surface is covered by the film 100. At this time, the transport 15 transports the film 100 to prepare a next molding cycle.

Figure 6:
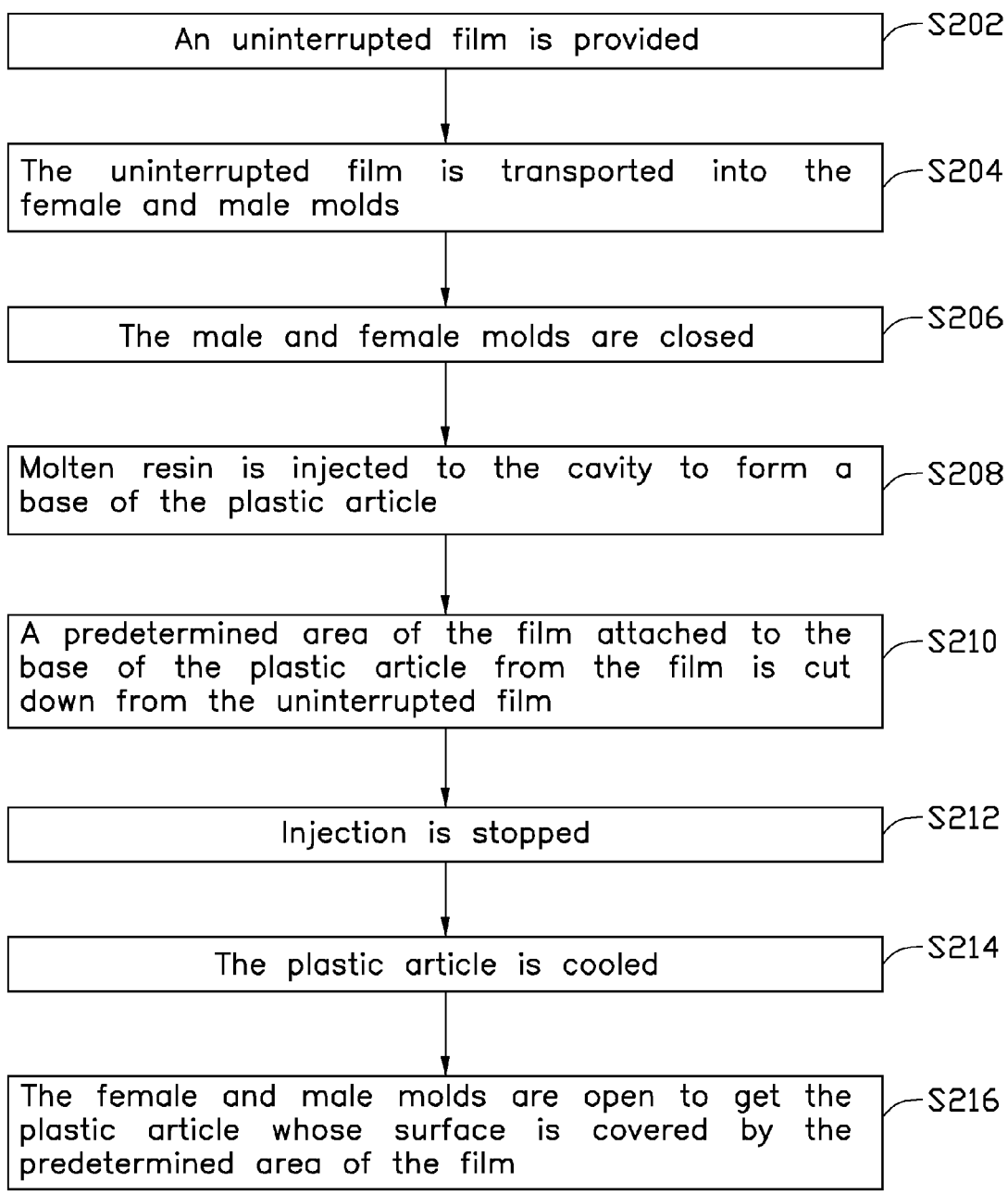
FIG. 6 is a flowchart of a second exemplary embodiment of the method for manufacturing the plastic article.

Referring to FIG. 6, a second embodiment of a method for manufacturing a plastic article includes the following steps.

Step S202, an uninterrupted film 100 with patterns and characters printed thereon, is provided, and rolled around the transporting roller 152 of the transport 15.

Step S204, the uninterrupted film 100 is transported between the female and male molds 25 and 30 by the transport 15, a predetermined area of the film 100 is attached to an inner surface of the cavity 22 of the female mold 25, as shown in FIG. 3. In one embodiment, the predetermined area of the film 100 attaches to the inner surface of the cavity 22 by vacuumizing the cavity 22 through the plurality of venting holes 23 of the female mold 25.

Step S206, the male and female molds 30 and 25 are closed.

Step S208, molten resin is injected into the cavity 22 from the injection port 34 of the male mold 30 to form a base of the plastic article, as shown in FIG. 4.

Step S210, the predetermined area of the film 100 attached to the base of the plastic article from the film 100 is cut from the uninterrupted film 100 after about 90%-99.5% of the molten resin is injected into the cavity 22.

Step S212, injection stops.

Step S214, the plastic article cools.

Step S216, the female and male molds 25 and 30 open to retrieve the plastic article whose surface is covered by the predetermined area of the film 100 from the mold. At the same time, the transport 15 transports the film 100 to prepare for the next molding cycle.

Figure 7A:
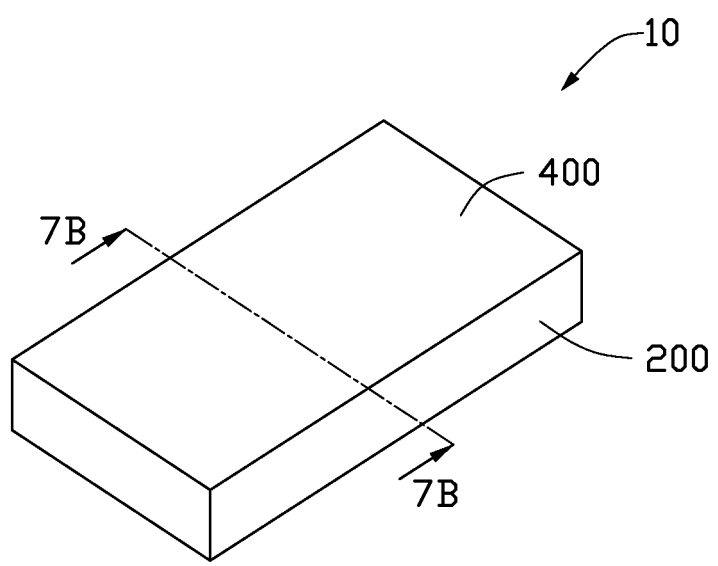
FIG. 7A is a schematic view of a plastic article manufactured by the method.
Figure 7B:
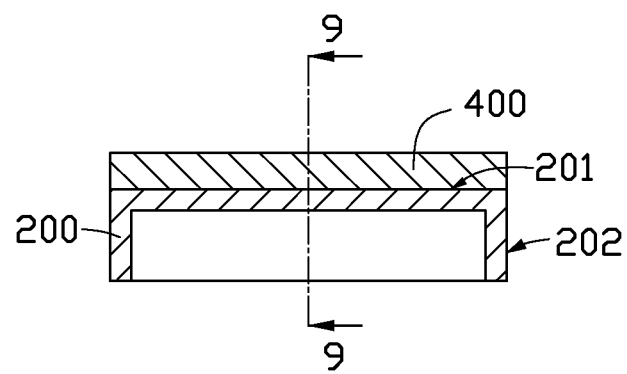
FIG. 7B is a cross-sectional view of the plastic article of FIG. 7A, taken along the line of 7B-7B.

Referring to FIGS. 7A and 7B, a plastic article 10 manufactured by the above-mentioned methods includes a base 200 and an attached film 400 cut from the film 100. The base 200 includes a top portion 201 and a flange 202 extending from edges of the top portion 201. The attached film 400 attaches to the top portion 201 of the base 200 opposite to the flange 202 and fully covers the top portion 201.

Figure 8A:
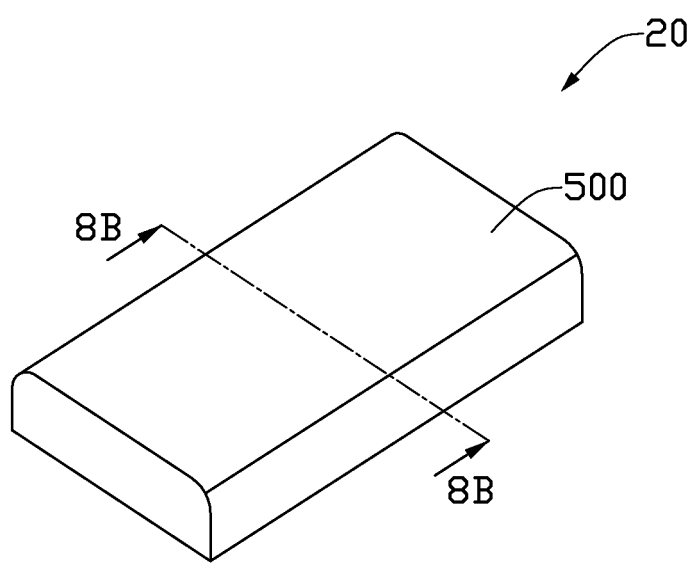
FIG. 8A is a schematic view of another plastic article manufactured by the method.
Figure 8B:
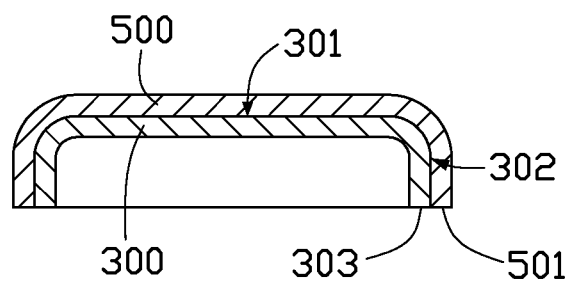
FIG. 8B is a cross-sectional view of the plastic article of FIG. 8A, taken along the line of 8B-8B.

Referring to FIGS. 8A and 8B, another plastic article 20 manufactured by the above-mentioned methods includes a base 300 and an attached film 500. The base 300 includes a top portion 301 and a flange 302 extending from edges of the top portion 301. The attached film 500 attaches to the top portion 301 of the base 300 opposite to the flange 302 and fully covers the top portion 301 and the flange 302.

In this embodiment, the base 300 includes a first edge 303. The attached film 500 includes a second edge 501 level to the first edge 303 of the base 300.

Figure 9A:
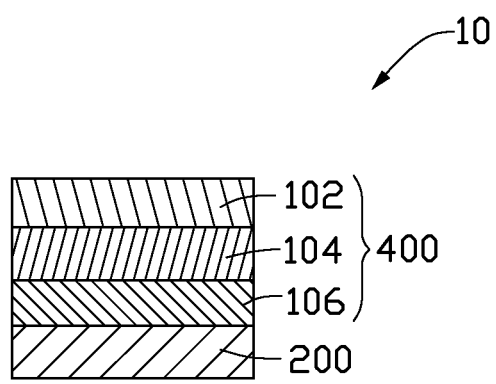
FIG. 9A is a cross-sectional view of the plastic article of FIG. 7B, taken along the line of 9-9, and showing a structure of an attached film.

Referring to FIG. 9A, the film 100 includes a base layer 102, a pattern layer 104 having different patterns and characters and printed on the base layer 102 by printing ink, and an attaching layer 106. The pattern layer 104 is sandwiched between the base layer 102 and the attaching layer 106.

The base layer 102 functions as a scratch/abrasion-resistant for the pattern layer 104. The base layer 102 generally consists of at least one polycarbonate, polyethylene terephthalate, acrylic, oriented polypropylene, or polyvinyl chloride, for example. The thickness of the base layer 102 can range from about 0.01 millimeters to about 0.125 millimeters.

Figure 9B:
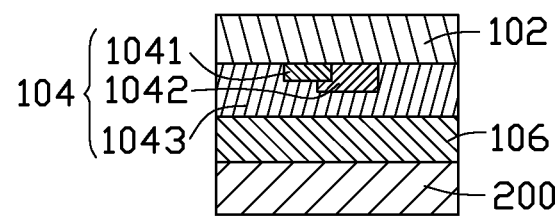
FIG. 9B is a cross-sectional view of the plastic article of FIG. 7B, taken along the line of 9-9, and showing an altered structure of the attached film.

The pattern layer 104 is arranged on the inner surface of the base layer 102. Referring to FIG. 9B, the pattern layer 104 includes a plurality of ink layers provided via screen printing, such as ink layers 1041, 1042, and 1043. The thickness of each ink layer can range from about 0.005 millimeters to about 0.02 millimeters. A metal decorative layer can be provided as the pattern layer 104. The metal decorative layer plating may be aluminum, chromium, copper, nickel, indium, or tin, alone or combined, on the base layer 102 via either a vacuum evaporation or electroplating method.

The attaching layer 106 is for attaching the film 100 to the outer surface 32 of the plastic article 30. The attaching layer 106 may be made from a plurality of resin materials consisting of acrylic, nitrification fiber, polyamine formate, chlorination rubber, vinyl chloride-co-vinyl-acetic ester copolymer, polyamide, polyester, epoxy, polycarbonate, olefin, and acrylonitrile-butylene-styrene monomer resin, for example. The attaching layer 106 is generally provided via concave, screen, and offset printing, or spraying, dip-coating method, or a coating in reverse order method, for example.

The base layer 102 may be either transparent or translucent to reveal the patterns and/or colors of the pattern layer 104.

In an altered embodiment, the film 100 includes a base layer 102 and an attaching layer 106 directly attached to the base layer 102, but does not include a pattern layer 104, for highlighting the natural color of the resin of the plastic article 30 through the transparent or translucent base layer 102. It is noteworthy that in other embodiments, the base layer 102 may be made of a colored material, for adding color to the plastic article.

Figure 10:
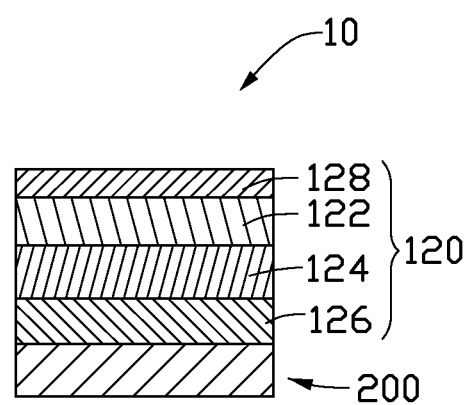
FIG. 10 is a cross-sectional view of another structure of the attached film.

Referring to FIG. 10, in another alternative embodiment of this disclosure, the plastic article 10 may include an attached film 120 attached to the base 200 of the plastic article 10. The attached film 120 includes a base layer 122, a first pattern layer 124, a second pattern layer 128, and an attaching layer 126. The second pattern layer 128 directly attaches to the base layer 122 opposite to the first pattern layer 124.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A method for forming a plastic article using a male mold and a female mold, the method comprising:
   providing an uninterrupted film;
   transporting the uninterrupted film between the female and male molds, with a predetermined area of the film attached to an inner surface of a cavity of the female mold;
   closing the male and female molds to a first position, with a first parting surface of the male mold not contacting a second parting surface of the female mold;
   injecting molten resin into the cavity to form a base of the plastic article;
   during injecting, further closing the male and female mold to a second position and cutting the predetermined area of the film from the uninterrupted film;
   stopping injecting;
   cooling; and
   opening the female and male molds to retrieve the plastic article.

2. The method of claim 1, wherein the male and female molds close to the second portion when about 90%-99.5% of the molten resin is injected into the cavity.

3. The method of claim 1, wherein the film comprises a base layer and an attaching layer.

4. The method of claim 3, wherein the film further comprises a pattern layer having patterns and/or characters printed on the base layer and sandwiched between the base layer and the attaching layer.

5. A method for forming a plastic article using a male mold and a female mold, the method comprising:
   providing an uninterrupted film;
   transporting the uninterrupted film between the female and male molds, with a predetermined area of the film attached to an inner surface of a cavity of the female mold;
   closing the male and female molds;
   injecting molten resin to the cavity to form a base of the plastic article;
   cutting the predetermined area of the film from the uninterrupted film, wherein the predetermined area of the film is cut from the uninterrupted film after about 90%-99.5% of the molten resin is injected into the cavity;

stopping injecting;

cooling; and opening the female and male molds to retrieve the plastic article.

6. The method of claim 5, wherein the film comprises a base layer and an attaching layer.

7. The method of claim 6, wherein the film further comprises a pattern layer having patterns and/or characters printed on the base layer and sandwiched between the base layer and the attaching layer.

8. The method of claim 7, wherein the base layer is transparent or translucent to reveal the pattern and/or characters of the pattern layer.

9. The method of claim 5, wherein the film comprises a base layer and an attaching layer, the base layer is transparent or translucent for revealing a natural color of the resin.

* * * * *